US007565405B2

(12) United States Patent
Grosse et al.

(10) Patent No.: US 7,565,405 B2
(45) Date of Patent: Jul. 21, 2009

(54) METHOD AND APPARATUS FOR PROVIDING DATA STORAGE IN PEER-TO-PEER NETWORKS

(75) Inventors: Eric Henry Grosse, Berkeley Heights, NJ (US); David Leo Presotto, Mountain View, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1215 days.

(21) Appl. No.: 10/948,879

(22) Filed: Sep. 24, 2004

(65) Prior Publication Data

US 2006/0075063 A1 Apr. 6, 2006

(51) Int. Cl.
G06F 13/00 (2006.01)
(52) U.S. Cl. .......................... 709/214; 709/226; 707/10
(58) Field of Classification Search ................ 709/213, 709/214, 217, 218, 223, 225; 707/10
See application file for complete search history.

(56) References Cited

U.S. PATENT DOCUMENTS 6,237,008 B1 * 5/2001 Beal et al. .................... 707/204
6,499,112 B1 * 12/2002 Milillo et al. ................. 714/6
7,243,103 B2 * 7/2007 Murphy et al. ............... 707/10

OTHER PUBLICATIONS

K. Anagnostakis, et al, "Exchange-based Incentive Mechanisms for Peer-to-Peer File Sharing," *Distributed Computing Systems, 2004. Proceeding. 24th International Conference*, (Mar. 24-26, 2004), pp. 524-533.
I. Stoica, et al, "Chord: A Scalable Peer-to-Peer Lookup Protocol for Internet Applications," *IEEE/ACM Transactions on Networking*, vol. 11, Issue: 1, (Feb. 2003), pp. 17-32.
M. Castro, et al, "An Evaluation of Scalable Application-Level Multicast Built Using Peer-to-Peer Overlays," *INFOCOM 2003. Twenty-Second Annual Joint Conference of the IEEE Computer and Communications Societies. IEEE*, vol. 2, (Mar. 30-Apr. 3, 2003), pp. 1510-1520.
S. Rhea, et al, "Maintenance-Free Global Data Storage," *IEEE Internet Computing*, (Oct. 2001), pp. 40-49.
I. Clarke, et al, "Protecting Free Expression Online with Freenet," *IEEE Internet Computing*, (Feb. 2002), pp. 40-49.

* cited by examiner

*Primary Examiner*—Viet Vu
(74) *Attorney, Agent, or Firm*—Donald P. Dinella

(57) ABSTRACT

A method and apparatus for enhanced data storage in peer-to-peer (P2P) networks. Users subscribe to a P2P storage network that allows each user to store files on the storage network by swapping blocks of the user's files with blocks from storage of a peer, or peers, on the network. A user desiring to utilize the storage network for a certain data block must take back an equal, or substantially equal, storage block from another peer on the network thereby insuring no net change, or minimal net change, in total storage across the P2P storage network. In addition, the diffusion of data blocks throughout the storage network is employed whereby individual peers swap data blocks on a random basis thereby further enhancing the security of the swapped blocks from direct attacks.

15 Claims, 4 Drawing Sheets

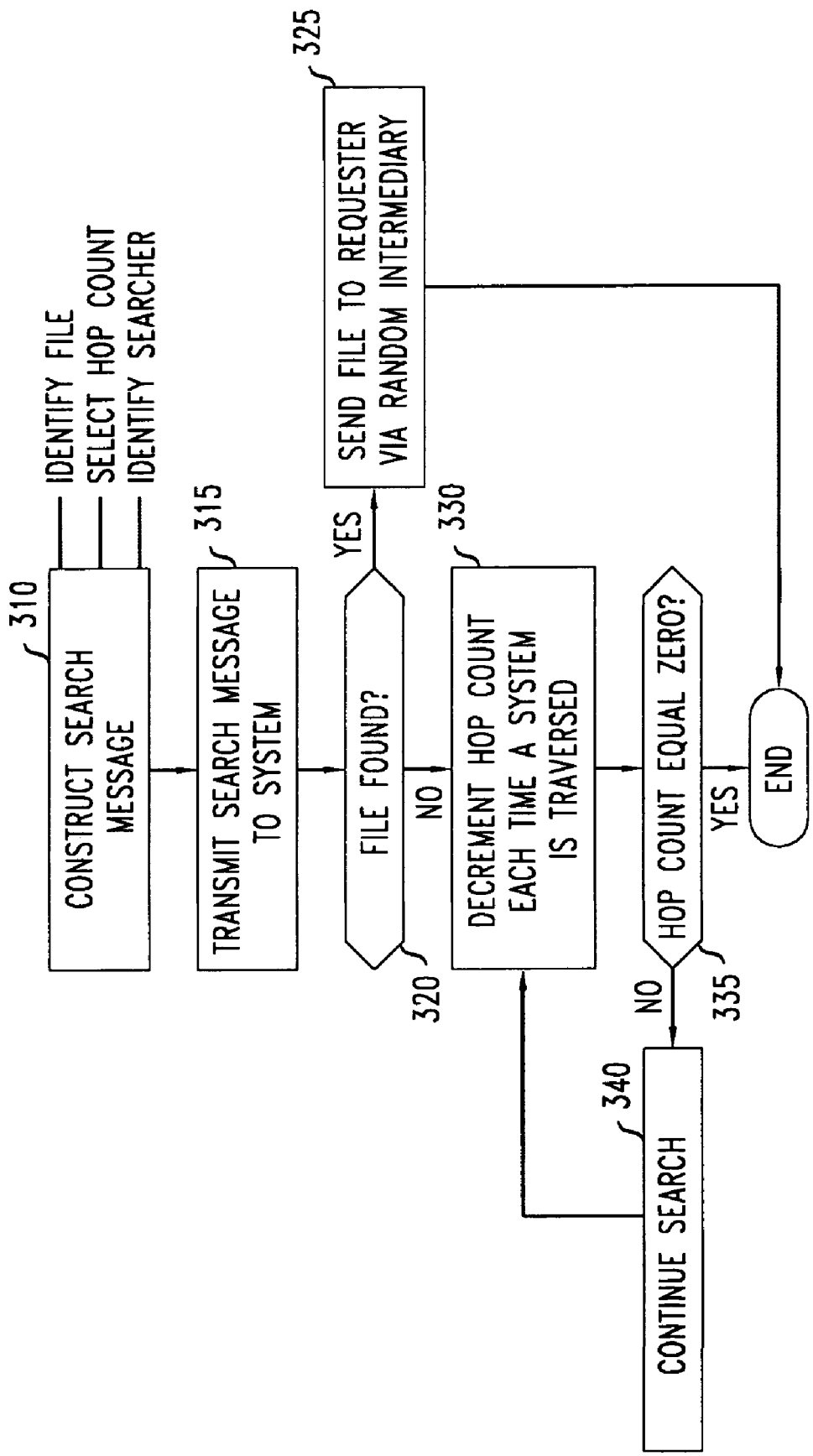

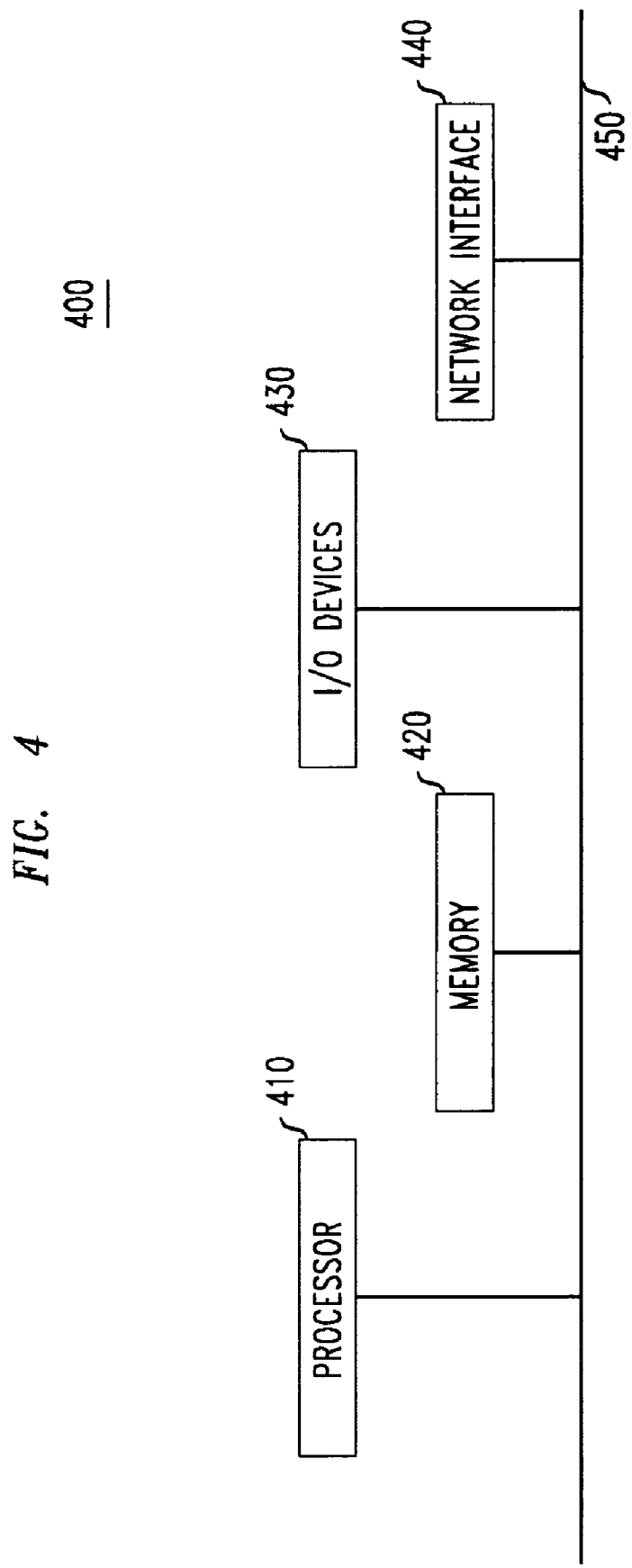

METHOD AND APPARATUS FOR PROVIDING DATA STORAGE IN PEER-TO-PEER NETWORKS

FIELD OF THE INVENTION

The present invention relates generally to peer-to-peer networks and, more particularly, to a method and apparatus for providing data storage in such peer-to-peer networks.

BACKGROUND OF THE INVENTION

Peer-to-peer (P2P) networks are well-known distributed computer systems which have no centralized control or hierarchical organization (see, for example, J. Li et al., "A Scalable Location Service for Geographic Ad Hoc Routing", *Proceedings ACM/IEEE Mobicom*, pp. 120-130, August 2000, which is hereby incorporated by reference). Features of P2P networks which have attracted use of such systems include (1) the lack of a central server thereby making it easier for users to form a P2P network without a significant hardware investment to operate the desired network; (2) leveraging a large amount of processing and storage resources which would otherwise be idle or operated at lower efficiencies; and (3) a certain degree of robustness to faults which facilitates long term storage.

One well-known P2P architecture is the so-called "Freenet" which is a distributed information storage system (see, I. Clarke et al., "Protecting Free Expression Online with Freenet", *IEEE Internet Computing*, pp. 40-49, January-February 2002, which is hereby incorporated by reference; and www.freenetproject.org). Freenet, among other things, provides a scalable and fault tolerant storage system which operates using a completely decentralized architecture and a self-organizing P2P network that pools unused disk space across large numbers of desktop computers to create a collaborative virtual file system (see, Clarke supra at p. 40). Participants in the Freenet system each run a node that provides the network a certain storage space. To add a new file, a user sends the network an insert message containing the file and its so-called location-independent globally unique identifier (GUID) which causes the file to be stored on some set of nodes (see, Clarke supra at p. 44). During a file's lifetime, it might migrate to or be replicated on other nodes, and is ultimately retrieved by a user through the broadcast of the GUID request such that when the GUID request reaches the node holding the particular file that node passes the file back to the requester. Freenet's designers focused (see, Clarke supra at p. 41) on four main features: (1) privacy; (2) resistance to information censorship; (3) high availability and reliability through decentralization; and (4) efficient, scalable and adaptive storage and routing. Freenet's decentralization, anonymity of reader/writers and encrypted content make Freenet more robust against hostile attacks. However, Freenet does not explicitly try to guarantee permanent data storage instead using a probalistic storage policy (see, Clarke supra at p. 46) which requires a node upon receiving a new file (and faced with a storage capacity problem) to delete the least recently requested files in its data store until enough storage is cleared for the newly arrived file.

In addition to Freenet, there exist several other well-known P2P file storage systems such as "OceanStore" (see, S. Rhea et al., "Maintenance-Free Global Data Storage", *IEEE Internet Computing*, pp. 40-49, September-October 2001, which is hereby incorporated by reference), the "Cooperative File System" (see, F. Dabek et al., "Wide-Area Cooperative Storage with CFS", *Proc. 18th ACM Symp. Operating System Principles* (SOSP 2001), ACM Press, New York, 2001, which is hereby incorporated by reference), and "PAST" (see, A. Rowstron et al., "Storage Management and Caching in PAST, a Large-Scale, Persistent Peer-to-Peer Storage Utility", *Proc. 18th ACM Symp. Operating System Principles* (SOSP 2001), ACM Press, New York, 2001, which is hereby incorporated by reference). Each of these P2P networks focus more on efficient data location rather than security against malicious attacks.

The aforementioned P2P networks provide for the storage and replication of an individual's data across a geographic area and provide certain levels of protection from malicious attacks. In delivering such P2P storage attributes to their users, these types of P2P networks utilize various schemes that allow for the quick mapping from data description (e.g., file name) to the location of replicas (or directories describing the replicas). While such quick mapping works well to protect data from faulty media or disasters they remain vulnerable to direct attacks. That is, quick mapping provides faster retrievals and redundancy protects data from faulty media or other disasters. However, such fast direct access implies that disrupting a few, statically determined, systems will suffice to disrupt access. Further, there is no defense against well-known denial-of-service (DOS) attacks caused by the mere insertion (by a hacker or other person intent on doing harm) of "junk" data into the network. That is, by the time a determination is made (if ever) that the network is being subject to a DOS a large amount of data may be lost forever. Such vulnerability stems from the ease at which data or data directories can be quickly determined and attacked by unauthorized users.

In K. G. Anagnostakis et al., "Exchange-based Incentive Mechanisms for Peer-to-Peer File Sharing", *IEEE International Conference on Distributed Computing* (ICDCS 2004), Tokyo, Japan, Mar. 23-26, 2004, which is hereby incorporated by reference, a peer-to-peer filing sharing system is described which employs both so-called "exchange transfers" and "non-exchange transfers" whereby users share resources between themselves. The exchange transfers in this system occur only amongst peers that choose to participate in a N-way exchange amongst a ring of N peers, where each peer is served by its predecessor and serves its successor in the ring. As such, this system employs a fixed ring of peers amongst which exchange transfers may occur. Otherwise, non-exchange transfers are possible where no sharing of resources is required.

Thus, there exists a need for an enhanced peer-to-peer technique that addresses the aforementioned vulnerabilities related to malicious attacks while maintaining an effective distributed storage solution which is free form (i.e., non-fixed) in nature to increase flexibility and transferability amongst peers thereto.

SUMMARY OF THE INVENTION

The present invention provides a method and apparatus for enhanced P2P information storage. More particularly, in accordance with an aspect the invention, users subscribe to a P2P network that allows each user to store files (e.g., data files) on the storage network by swapping blocks of the user's files with blocks from storage of a peer, or peers, on the P2P network. Thus, in accordance with this aspect of the invention, a user desiring to utilize the storage network for a certain data block must take back an equal, or substantially equal, storage block from another peer on the P2P network thereby insuring no net change, or minimal net change, in total storage across the P2P network. In accordance with an embodiment of the invention, the diffusion of data blocks throughout the storage network is employed whereby individual peers swap data blocks on a random basis (and at a random interval) thereby further enhancing the security of the randomly swapped blocks from direct attacks.

In accordance with an embodiment of the invention, individual files are accompanied by (1) a character identifying the file, or a hash code; or (2) one or more addresses of other participating systems in the P2P network thereby diffusing information about subscribers across the entire network; or (3) the address of the machine (e.g., a server) first inserting the file into the P2P network. Individual files are retrieved by a user, in accordance with an embodiment of the invention, by initiating a search across the network by sending one or more search messages, each such search message containing at least (1) the identity of the file being searched, (2) a hop count, where the hop count is decreased each time a particular P2P network is traversed during the search process; and (3) the identity of the user (i.e., searcher).

These and other objects, features and advantages of the present invention will become apparent to those of ordinary skill in the art from the following detailed description of illustrative embodiments thereof, which is to be read in connection with the accompanying drawings.

BRIEF DESCRIPTION OF THE DRAWINGS

FIG. 3 shows a flowchart of illustrative operations for retrieving, in accordance with the principles of the present invention, files in the P2P network of FIG. 1; and FIG. 4 shows a block diagram illustrating a generalized hardware architecture of a peer computer system suitable for implementing the various aspects of the invention.

DETAILED DESCRIPTION

The following description will illustrate the invention in the context of an exemplary P2P network. It will be understood, however, that the invention is not necessarily limited to use with any particular P2P network but rather is instead more generally applicable to any peer-to peer environment in which it is desirable to have random distribution of files with increased security.

Figure 1:
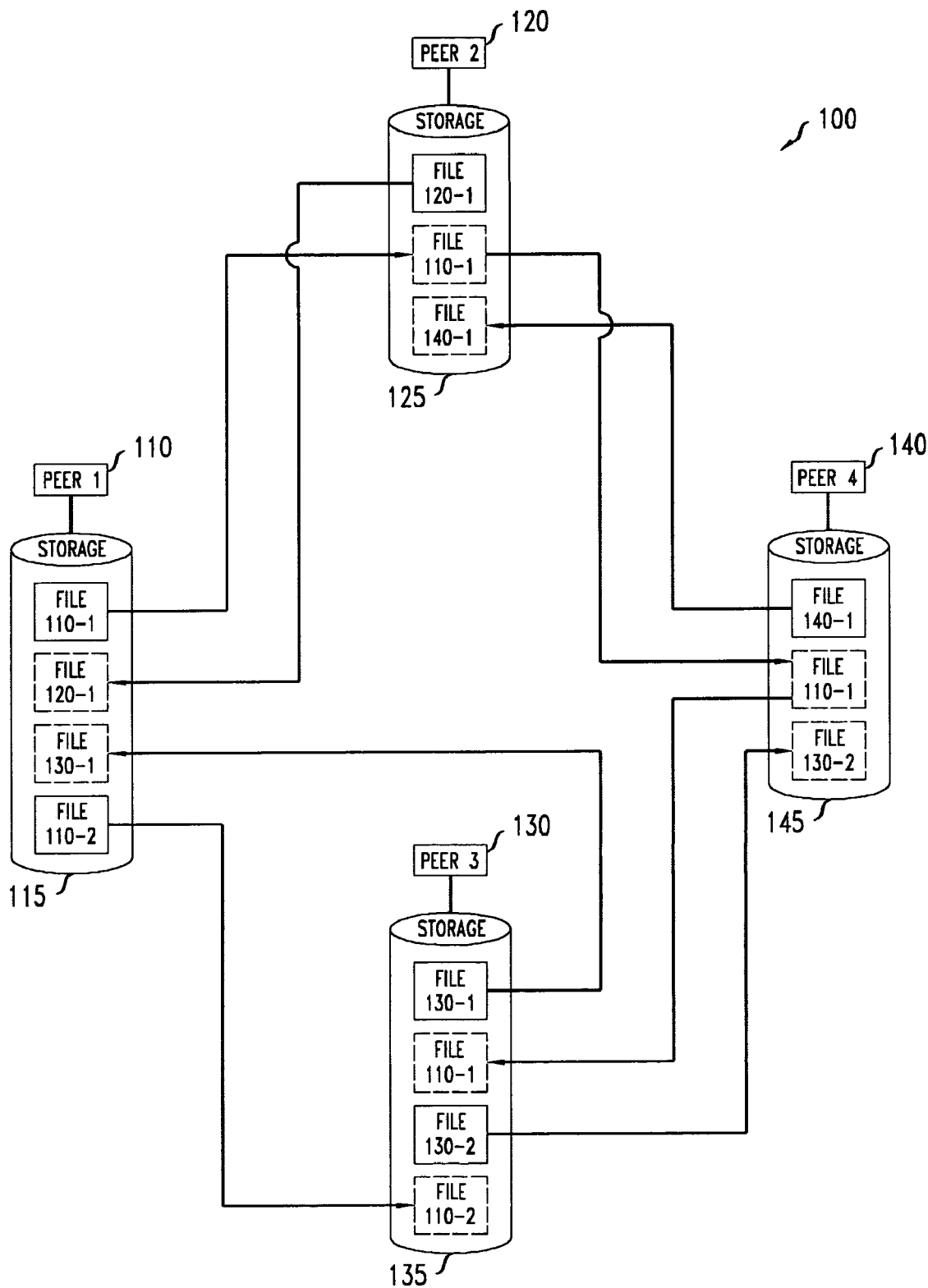
FIG. 1 shows an illustrative P2P storage system configured in accordance with the principles of the invention.

In accordance with an aspect the invention, users subscribe to a P2P network that allows each user to store files (e.g., data files) on the storage network by swapping blocks of the user's files with blocks from storage of a peer, or peers, on the network. FIG. 1 shows an illustrative P2P network 100 configured in accordance with the principles of the invention. P2P network 100 includes peer 110, 120, 130 and 140 which, as will be appreciated, such peers may be a personal computer, server or other such hardware device configured to operate in and with a P2P network such as the one shown in FIG. 1. Each such peer has associated storage, namely storage 115, 125, 135 or 145, that provides conventional electronic storage facilities. As such, files 110-1, 110-2, 120-1, 130-1, 130-2 and 140-1 can be stored in the various storage facilities (i.e., storage 115, 125, 135 or 145) of P2P network 100. Of course, a computer system for accessing or utilizing the Internet, such as P2P network 100, would have other well-known components as well (e.g., proxy servers, firewall, etc.), such other components are not shown in FIG. 1 for clarity.

Figure 2:
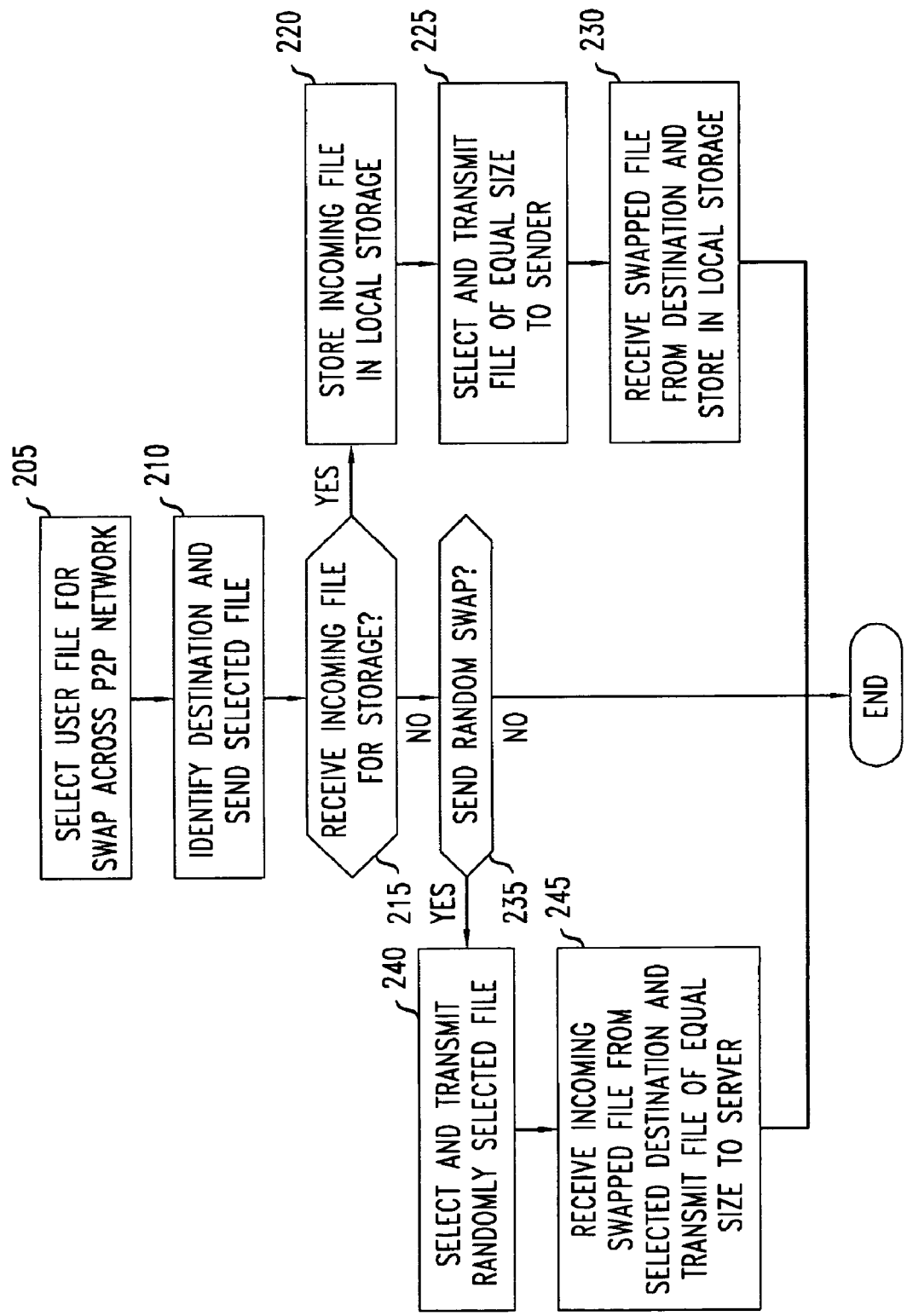
FIG. 2 shows a flowchart of illustrative operations for storing, in accordance with the principles of the present invention, files in the P2P network of FIG. 1.

FIG. 2 shows a flowchart of illustrative operations for storing, in accordance with the principles of the present invention, files in the P2P network 100 of FIG. 1. More particularly, in accordance with an aspect of the invention, the user selects a particular file (or files) for swapping across P2P network 100 (see, FIG. 2, block 205), identifies a destination and sends the selected file to the intended destination (see, FIG. 2, block 210). Illustratively, a user associated with peer 110 might desire to swap file 110-1 in order to increase the security of the file, and select another user (i.e., another user/peer subscribing to the constructs of P2P network 100) associated with peer 120 as the intended recipient of this swap request. As such, in accordance with an aspect of the invention, a determination is made (at the selected destination/peer) whether the incoming file is to be stored (see, FIG. 2, block 215).

If so, the peer will store the received file in local storage (see, FIG. 2, block 220). In the illustrative example, as shown in FIG. 1, peer 120 will store file 110-1, upon receipt, in storage 125. As will be appreciated, for simplicity this illustrative example is described in terms of a file but it will be understood that the various aspects of the invention apply equally to individual files, multiple files and various sizes of data blocks of memory, to name just a few. After storing file 110-1, peer 120 will select and transmit a file of equal, or of substantially equal, size to that of file 110-1 back to the sender (see, FIG. 2, block 225). In the illustrative example of FIG. 1, file 120-1 is selected and transmitted back to peer 110 for retention in storage 115 (see, FIG. 2, block 230).

In accordance with a further embodiment of the invention, any one of the peers (of the P2P network) may initiate a random swap to increase reliability and diffusion across all the files swapped in accordance with the principles of the invention. Advantageously, the invention provides for swapping on a random basis and at random intervals thereby increasing the security aspects of the P2P network. This randomness aspect of the invention is facilitated by the fact that the P2P network configured in accordance with the invention is essentially "free form". That is, the peers of the P2P network are not required to be in any hierarchical or fixed structure (e.g., a ring), rather, the peers are "scattered" thereby joining and participating in the file swapping in a non-fixed overall architecture. For example, peer 120 may initiate and send a random swap (see, FIG. 2, blocks 235 and 240) that transmits file 110-1 to peer 140 (see, FIG. 1) for storing in storage 145. In turn, peer 120 will receive the file and transmit, on a random basis, a file (for example, file 140-1 as shown in FIG. 1) of equal, or substantially equal, size to peer 140 for retention in storage 125 (see, FIG. 2, block 245). As will be appreciated, the transmission of the swapped files across P2P network 100 may occur in any number of well-known communications methodologies including but not limited to packet-based communications.

Continuing with the illustrative example of FIG. 1, the user associated with peer 130 desires to save file 130-2, in accordance with the principles of the invention, across P2P network 100 by initiating the transmittal of such file to peer 140. Peer 140, in accordance with the principles of the invention, stores file 130-2 in storage 145 and transmits a file of equal, or substantially equal, size, for example, file 110-1 to peer 130 for storing in storage 135. As one will appreciate from this illustrative example, file 110-1 has now been subject to multiple swaps across P2P network 100 without any material net change in the overall storage requirements across P2P network 100. Alternatively, in accordance with a further aspect to the invention, the user of peer 110 might elect to save file 110-1 multiple times across a number of peers thereby increasing the reliability of retrieving the file at some point in time, such increased reliability being traded off for the increase in local storage space that is required. Further, files swapped in accordance with the invention may be transmitted in either uncompressed or compressed formats and may include (i) a character string identifying the file (or the file may be identified with a well-known hash code), (ii) one or more addresses of other P2P networks participating in the storage methodology, and/or (iii) the address of the peer which first inserted the file into the P2P network for storage. Finally, in terms of the illustrative example of FIG. 1, peer 130 might initiate a random swap which results in the swapping of file 130-1 and file 110-2, respectively, between peer 130 and peer 110.

Advantageously, in accordance with the aspects the invention, users subscribing to P2P network 100 are provided with the ability of storing information on the storage network by swapping blocks of the user's files with blocks from storage of a peer, or peers, on the network. Thus, in accordance with the invention, a user desiring to utilize the storage network for a certain data block must take back a block (of equal or substantially equal size) from another peer on the network thereby insuring no material net change in total storage across the P2P storage network.

FIG. 3 shows a flowchart of illustrative operations for retrieving, in accordance with the principles of the present invention, files swapped in the P2P network of FIG. 1. More particularly, in accordance with principles of the invention, files are retrieved by constructing and sending a search message (see, blocks 310 and 315) to the P2P network. The search message will contain at least (i) the identity of the file being searched, (ii) a hop count, and (iii) the identity of the searcher. As the search message traverses the P2P network (e.g., P2P network 100) each peer checks (see, block 320) whether the particular file is residing in its local storage. If so, the file is sent to the searcher/requester (see, block 325) via an intermediary peer chosen at random such that the requester has no knowledge of the identity of the peer (and associated network) storing the file thereby further preserving the security associated with the stored file. If the file is not found by the particular peer, the hop count is decreased each time a particular P2P network is traversed (see, block 330) and if the hop count is not zero (see, block 335) the search is continued (see, block 340), otherwise the search message is dropped and the search is discontinued in such system.

Referring now to FIG. 4, a block diagram illustrates a generalized hardware architecture of a peer computer system suitable for implementing the various aspects of the invention. More particularly, it will be appreciated that peer 110 in FIG. 1, for example, may implement such a computer system 400 to perform the methodologies (algorithms) of the present invention. Also, one or more system components (e.g., in a particular P2P design) may implement such a computing system 400. In addition, it will be understood that the invention is not limited to any particular computing system implementation.

In the illustrative implementation of FIG. 4, a processor 410 for implementing at least a portion of the methodologies (algorithms) of the present invention is operatively coupled to a memory 420, input/output (I/O) device(s) 430 and a network interface 440 via bus 450 or any number of well-known alternative arrangements. It will be appreciated that the term "processor" as used herein is intended to include any processing device (or multiple processing devices), for example, one which includes a central processing unit (CPU) and/or other processing circuitry (e.g., digital signal processor (DSP), microprocessor, etc.). The term "memory" as used herein is intended to include memory and other computer-readable media associated with a processor or CPU, for example, random access memory (RAM), read only memory (ROM), fixed storage media (e.g., a hard drive), removable storage media (e.g., a CD-ROM), or flash memory. In addition, the phrase "I/O devices" as used herein is intended to include one or more input devices (e.g., keyboard, mouse, etc.) for proving input to the processing unit, as well as one or more output devices (e.g., display device, etc.) for providing results associated with the processing unit.

It will also be appreciated that while the present invention has been described herein in the context of P2P networks, the methodologies of the invention may be capable of being distributed in the form of computer readable media, and that the present invention may be implemented, and its advantages realized, regardless of the particular type of media actually used for distribution. The term "computer-readable media" as used herein is intended to included recordable-type media (e.g., a CD-ROM, RAM, floppy disk, hard disk drive, etc.). Further, the computer-readable media may take the form of coded formats that are decoded for use in a particular system.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A storage method, said storage method comprising the steps of:

selecting a first file from a memory associated with a first peer of a plurality of peers, said plurality of peers forming a peer-to-peer network;

transmitting said selected first file to a second peer of said plurality of peers;

storing said selected first file in a memory associated with said second peer;

selecting, in response to receiving said transmitted first file at said second peer, a second file from a memory associated with said second peer, said selected second file being of substantially equal size as said selected first file;

transmitting said selected second file to said first peer; and storing said selected second file in said memory associated said first peer.

2. The method of claim 1 further comprising the steps of:

locating said first file by broadcasting at least one search message throughout said peer-to-peer network, said search message including an identifier associated with said first file, a hop count, and an identifier associated with a user of the said first peer.

3. The method of claim 2 wherein said locating step comprises the further steps of:

determining, as of function of said search message, whether said first file is currently stored at any one peer of said plurality of peers; and (i) if so stored, transmitting said first file to said first peer via a randomly selected other one peer of said plurality of peers; or (ii) if not so stored, decrementing said hop count.

4. The method of claim 3 wherein said peer-to-peer network's total storage capacity remains substantially unchanged.

5. The method of claim 2 further comprising the steps of:
selecting, on a random basis and at a random interval, at least one file from a memory associated with a third peer of said plurality of peers;
transmitting said randomly selected file from said third peer to a fourth peer of said plurality of peers;
storing said randomly selected file from said third peer in a memory associated said fourth peer;
selecting, in response to receiving said randomly selected file from said third peer, at least one file from a memory associated with said fourth peer, said selected file from said fourth peer being of substantially equal size as said randomly selected file from said third peer;
transmitting said selected file from said fourth peer to said third peer; and
storing said selected file from said fourth peer in said memory of said third peer.

6. The method of claim 1 further comprising the steps of:
selecting said first file from said memory associated with said second peer;
transmitting said first file from said second peer to a third peer of said plurality of peers;
storing said first file in a memory associated said third peer;
selecting, in response to receiving said first file from said second peer, at least one file from a memory associated with said third peer, said selected file from said third peer being of substantially equal size as said first file;
transmitting said selected file from said third peer to said second peer; and
storing said selected file from said third peer in said memory of said second peer.

7. A peer-to-peer apparatus, said apparatus comprising:
at least one memory; and
at least one processor coupled to said memory and operative for (i) selecting from said memory a first file associated with said peer-to-peer apparatus; and (ii) initiating a transmission of said selected first file from said apparatus to a particular peer of a plurality of peers, said apparatus and said plurality of peers forming a peer-to-peer network; and (iii) receiving and storing in said memory a second file associated with said peer wherein said second file is selected by said peer, in response to receiving said first file, and said second file being of substantially equal size as said first file.

8. The peer-to-peer apparatus of claim 7 wherein said transmission of said selected first file occurs at a request of a user associated with said peer-to-peer apparatus, and said first file contains at least one of the following: (a) a unique identifier associated with said first file; or (b) an address associated with another peer-to-peer network which is separate from said peer-to-peer network; or (c) an address associated with said first peer.

9. The peer-to-peer apparatus of claim 7 wherein said processor is further operative for locating said first file by broadcasting at least one search message throughout said peer-to-peer network, said search message including an identifier associated with said first file, a hop count, and an identifier associated with a user of the said first peer.

10. The peer-to-peer apparatus of claim 9 wherein said peer-to-peer network's total storage capacity remains substantially unchanged.

11. An article of manufacture comprising a machine-readable medium containing a plurality of instructions which when executed implement the steps of:
selecting a first file from a memory associated with a first peer of a plurality of peers, said plurality of peers forming a peer-to-peer network;
transmitting said selected first file to a second peer of said plurality of peers;
storing said selected first file in a memory associated with said second peer;
selecting, in response to receiving said transmitted first file at said second peer, a second file from a memory associated with said second peer, said selected second file being of substantially equal size as said selected first file;
transmitting said selected second file to said first peer; and
storing said selected second file in said memory associated said first peer.

12. The article of manufacture of claim 11 wherein said machine-readable medium further contains a plurality of instructions which when executed implement the further steps of:
locating said first file by broadcasting at least one search message throughout said peer-to-peer network, said search message including an identifier associated with said first file, a hop count, and an identifier associated with a user of the said first peer; and
determining, as of function of said search message, whether said first file is currently stored at any one peer of said peer-to-peer network; and
(i) if so stored, transmitting said first file to said first peer via a randomly selected other one peer of said plurality of peers; or
(ii) if not so stored, decrementing said hop count.

13. The article of manufacture of claim 12 wherein said machine-readable medium further contains a plurality of instructions which when executed implement the further steps of:
selecting, on a random basis and at a random interval, at least one file from a memory associated with a particular one of said peers;
transmitting said selected file to a particular one other peer of said plurality of peers;
storing said selected file in a memory associated said other peer;
selecting, in response to receiving said transmitted file at said other peer, at least one other file from a memory associated with said other peer, said at least one other file being of substantially equal size as said file;
transmitting said selected other file to said peer; and
storing said selected other file in said memory associated with said peer.

14. The article of manufacture of claim 12 wherein said machine-readable medium further contains a plurality of instructions which when executed implement the further steps of:
selecting said first file from said memory associated with said second peer;
transmitting said first file from said second peer to a third peer of said plurality of peers;
storing said first file in a memory associated said third peer;
selecting, in response to receiving said first file from said second peer, at least one file from a memory associated with said third peer, said selected file from said third peer being of substantially equal size as said first file;
transmitting said selected file from said third peer to said second peer; and
storing said selected file from said third peer in said memory of said second peer.

15. The article of manufacture of claim 11 wherein said peer-to-peer network's total storage capacity remains substantially unchanged.

* * * * *